US008960474B2

(12) United States Patent
Thaller et al.

(10) Patent No.: US 8,960,474 B2
(45) Date of Patent: Feb. 24, 2015

(54) FAN-LIKE VESSEL COVER/SPLASH GUARD

(75) Inventors: Georg Thaller, Montabaur (DE);
Jochen Kürschner, Wertheim (DE);
Thomas Kunkler, Nassau (DE);
Klaus-Jürgen Fischer, Hotzappel (DE);
Frank Weintritt, Heuchelheim (DE);
Verena Steudter, Herschbach (DE)

(73) Assignee: Leifheit AG, Nassau (DE)

( * ) Notice: Subject to any disclaimer, the term of this patent is extended or adjusted under 35 U.S.C. 154(b) by 0 days.

(21) Appl. No.: 13/883,817

(22) PCT Filed: Oct. 25, 2011

(86) PCT No.: PCT/EP2011/068655
§ 371 (c)(1),
(2), (4) Date: Dec. 2, 2013

(87) PCT Pub. No.: WO2012/062571
PCT Pub. Date: May 18, 2012

(65) Prior Publication Data
US 2014/0091090 A1    Apr. 3, 2014

(30) Foreign Application Priority Data
Nov. 11, 2010  (DE) .......................... 10 2010 060 510

(51) Int. Cl.
*A47J 36/06*    (2006.01)

(52) U.S. Cl.
CPC ...................................... *A47J 36/06* (2013.01)
USPC .................................... 220/212.5; 220/573.1

(58) Field of Classification Search
CPC .......... A47J 36/06; A47J 37/101; B65D 51/24
USPC ........... 220/573.1, 912, 212.5, 212, 287, 731; 99/341
See application file for complete search history.

(56) References Cited

U.S. PATENT DOCUMENTS

| 656,855 | A | * | 8/1900 | Pimlott | 220/287 |
| 1,524,185 | A | * | 1/1925 | Lockwood | 220/287 |
| 2,770,389 | A | * | 11/1956 | Drakoff | 99/341 |

FOREIGN PATENT DOCUMENTS

| DE | 1684345 | | 9/1954 |
| DE | 3318029 | A1 | 12/1984 |
| JP | H10-304918 | A | 11/1998 |
| JP | 2009-018132 | A | 1/2009 |
| KR | 200423724 | | 8/2006 |

OTHER PUBLICATIONS

Written Opinion for International Application No. PCT/EP2011/068655; 6 pages.

* cited by examiner

*Primary Examiner* — Robert J Hicks
(74) *Attorney, Agent, or Firm* — Panitch Schwarze Belisario & Nadel LLP

(57) ABSTRACT

A vessel cover and/or splash guard for cooking or household vessels, which may be formed from a plurality of individual segments that may be supported relative to one another so as to be rotatable about an axis of rotation at different heights, so that they can be fanned out a screen-like manner.

13 Claims, 1 Drawing Sheet

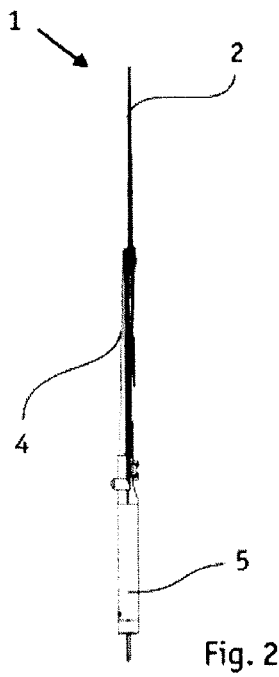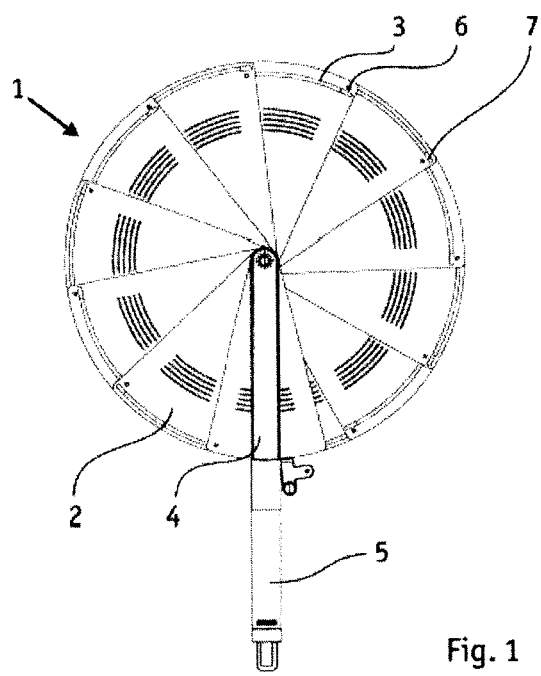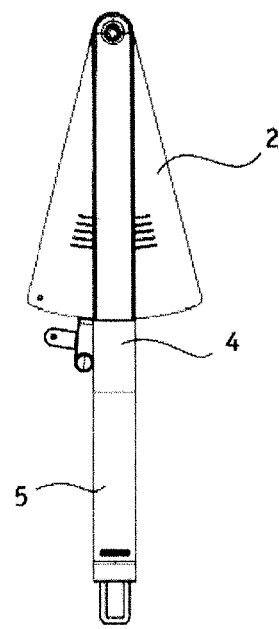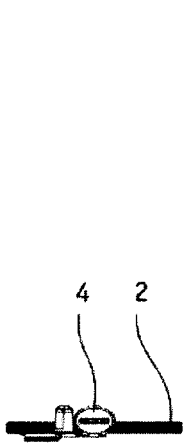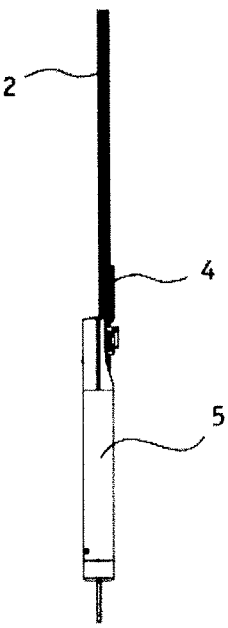

FAN-LIKE VESSEL COVER/SPLASH GUARD

The invention relates to a vessel cover for vessels in the form of cooking vessels or household vessels, comprising a cover, which is formed from a plurality of individual segments, which can be placed on the vessel edge, wherein the individual segments are supported relative to one another so as to be rotatable about an axis of rotation at different heights, so chat they can be fanned out in a screen-like manner for the purpose of forming the cover, which at least partially covers the vessel, and can be rotated one on top of the other so as to form a stack in an inoperative position.

Vessel covers of this type are known from DE 33 18 029 A1. These vessel covers are fanned out in a screen-like manner and, for this purpose, encompass a plurality of individual segments, which can be rotated about a common axis of rotation and which, after being fanned out, form a closed lid, which can be locked in place via a hook assembly in the area of the abutting individual segments.

In the case of the known vessel covers, the individual segments can be rotated about a central axis of rotation, wherein this axis of rotation is arranged in the area of a holding button, so that the vessel cover encompasses the shape of a typical lid, provided that the individual segments are fanned out and closed. The vessel cover can be attached to a pot or a pan via the holding button and can also be removed again.

The disadvantage of the known vessel covers is that, in particular when the individual segments are steam-permeable and when the vessel cover is embodied as support guard, there is a risk that the user gets scalded due to the steam, which escapes. A further disadvantage of the known vessel cover is that the escaping steam passes by the central button even if the vessel cover per se encompasses a rather closed character, so that there is a risk that this button heats up. On the one hand, this leads to the requirement to produce the button or a temperature-resistant material and, on the other hand, to the need to ensure that, by means of a suitable material selection, the button cannot heat up, so that touching the button remains uncritical for the cook.

It is a further disadvantage that the steam does not only bring heat, but also condensation water or even parts of the food to be cooked to the central button, so that the latter can become wet or can get dirty. This, in turn, leads to the risk that the vessel cover slips from the hand of the user or that the hands of the user get dirty.

A further vessel cover is known from DE 1 684 345 U. This vessel cover is an edge, which can be attached to a pan in a collar-like manner and thus expands the pan edge upward. In the area of the upper edge, this collar encompasses a screen-like vessel cover comprising a handle, wherein the individual segments are supported on an axis, which is arranged on the pan edge and are connected to the handle such that a rotation of the handle about this axis causes the screen to be fanned out towards the cover of the upper area of the collar.

This embodiment has the disadvantage that it requires a comparatively large amount of space when being stored in the cabinet, because the required space for storing this pan cover is substantially as large as the required space for storing the pan itself. Even if looking only at the cover of the upper area of the collar, the storage space would furthermore be comparatively large, because the individual segments also stick out from the handle in the folded up state and a certain width or length of the folded up cover is thus required. The axis must finally be dimensioned such that the individual segments can be clamped on one side and extend across the pen across the entire length thereof, so that the length of the individual segments at least in the central area thus corresponds to the diameter of the pan. This, in turn, leads to comparatively heavy individual segments, which, in turn is accompanied by a correspondingly high storage effort and a large weight of the pan cover. In the case of longer individual segments, there is furthermore the larger risk that they are resilient and thus sag in the area of the centre of the vessel on the one hand and that unwanted gaps are created on the other hand, through which the fat can escape, for example.

It is thus the object of the invention to create a vessel cover, which provides for a simple and secure covering or the vessel in response to a production effort, which is as small as possible, and which at the same time requires as little storage space as possible in the cabinet.

This object is solved according to the invention in that the axis of rotation is arranged on an end of an arm-like support element, which encompasses a handle, which projects beyond the cover in the closed state, wherein the individual segments are supported on the support element such that the stack of the individual segments, which are rotated one on top of the other, is arranged above or below the support element in the inoperative position.

By means of the vessel cover according to the invention, it is now possible to realize a particularly light cover for the vessel. In the context of this application, vessel cover thereby refers to every cover of a cooking or storage vessel or also of a processing vessel in the household area. This can be pans and pots, but the vessel cover can just as well also be used to cover bowls or other storage vessels, for example or also manually or motor-driven food-processing devices, respectively, comprising a corresponding accommodating bowl, such as salad spinners or cutting devices, for example. Depending on the particular application, the individual segment can be designed differently. For example, the individual segments may encompass a different length and shape comprising a shape such that the closed cover is embodied so as to be square, rectangular or oval. The transition area between two individual segments can furthermore be realized differently as a function of the application of the vessel cover, which will be explained below in more detail.

Two possible particular applications are a lid-like vessel cover or a vessel cover in terms of a steam-permeable splash guard for pans, for example. In the first case, the individual segments will be embodied so as to be steam-impermeable and can be made of a metal sheet or of a heat-resistant plastic, for example. In the second case, the individual segments will in contrast be embodied in a screen-like manner, at least in sections, as it is already known from the known splash guard screens.

The individual segment herein can encompass a frame, for example, between which a mesh screen made of plastic is arranged, the mesh size of which is so narrow that common fat droplets cannot pass, but steam particles can pass. Instead of such a frame, small windows can also be stamped into the individual segments, which are then covered via the mesh screen, wherein this mesh screen can be adhered to the individual segments or can also be inserted via a plug-in connection. In the latter case, it also becomes possible that the passage windows, which are stamped in, can also be closed via other, for example steam-impermeable plate elements, so that the vessel cover attains an additional exchangeability of the functionality.

The fact that the vessel cover of the rotatable individual segments is connected to the support element such that the individual segments, which are folded up to form a stack, can be arranged below the support, is the significant feature of the instant inversion. In this manner, the individual segments are simply rotated below the support element in the inoperative or storage position, so that the folded up package consisting of the stack of the individual segments and the support element, which is arranged thereabove or therebelow, requires very little storage space. Typically, the support element is embodied in a rod-shaped manner and encompasses the axis of rotation at its free end, that is, an axis, on which the individual segments are rotatably arranged in turn, is arranged here.

The individual segments are preferably embodied in the shape of a cross section of a piece of cake, wherein it goes without saying that any other shape is also possible. The division of the typically round or also angular area of the vessel cover into the individual segments, however, suggests segments, which taper inwardly, wherein, in the case of a different embodiment of the invention, the support element can also be so long than the axis of rotation is arranged in the area of the edge of the vessel, for example, so that the individual segments can then be embodied in the manner of a circular arc or sickle-shaped, for example. In the case of this embodiment of the invention, the fact that the individual segments can be folded up such that they can be folded up to form a stack, which is arranged below the support element, is also significant in the case of this embodiment of the invention.

On one side, the support element can encompass a stop, against which the individual segments can be rotated. In this case, the opening direction of rotation of the screen-like cover is determined. In this embodiment, the support element can also encompass a foldable or displaceable closure on the opposite side of the stop, which can be folded downward when the stack of the individual segments is folded up, so that the individual segments are held between this closure element and the opposite stop and cannot fan out unknowingly in the cabinet again.

On its end, which is located opposite the axis of rotation, the support element is embodied as handle, which is preferably embodied to be so large that it projects beyond the vessel edge. This has the effect that the candle is not arranged in the area of the steam, which escapes from the vessel, and can thus not become dirty or does it heat up. It goes without saying that a suitable material can also ensure here that heat, which is transferred to the support element via the individual segments, for example, is not transferred to the handle, so that a safe operation of the vessel cover is possible even in response to higher cooking temperatures.

In the case of a further preferred embodiment, the lower individual segment encompasses an abutment, which is able to support itself against a correspondingly embodied part of the vessel. In the case of a pot or of a pan, for example, this vessel typically encompasses at least one handle, which projects laterally beyond the vessel in the shape of a typical handle or arm. This handle can be used to spread out the screen-like vessel cover in a particularly simple manner. For this purpose, the vessel cover with folded up stack of individual segments is placed on the vessel edge such that the abutment is able to support itself against the handle or the arm of the vessel in response to a first rotation.

A further rotating of the support element then has the result that the individual segments are fanned out. To make it easier here to place the support element and so that the support element does not need to be balanced on the pan edge while the rotary motion takes place at the same time, the support element can be extended beyond the axis of rotation up to the opposite pan edge and can encompass a rest at that location, so that the support element can be placed on the pan and does not need to be kept in balance.

In the case of the above-mentioned embodiment of the support element comprising an abutment and a rest being located opposite the abutment, the abutment can also be embodied such that it can be inserted in a resilient manner into the handle or the arm of the vessel in the case of a specific embodiment, which is matched specifically to a certain vessel type, for example, so that the vessel cover is held securely on the vessel during the entire cooking process. In the case of this embodiment, the user can fan out the cover, depending on the special cooking features. In contrast, by simply rotating the handle, the user needs free access to the vessel or in the event that the food to be cooked is to boil down slowly, respectively, the user will open the cover by rotating the handle into the opposite direction and by thus folding up the stack of the individual segments and by arranging it below the support element. In this case, the vessel cover can nonetheless remain securely on the pan and will, however, only cover an area in the shape of a single individual segment. This means that the vessel is substantially no longer covered in this case, but remains completely open.

The individual segments are preferably embodied such that adjacent individual segments are supported against one another. For this purpose, each individual segment can encompass a guide journal, which projects downward and which is held in a radial groove, which is arranged in the outer area of the individual segment located therebelow. A positive guide between the two individual segments results in this manner, wherein the groove ends in each case serve as front and rear stop. In the event that the lowermost or uppermost individual segment is now moved, it will take along the next individual segment after reaching the stop, so that each individual segment located therebetween can be moved only by means of an application of force onto this individual segment in response to the rotation of the lowermost or uppermost individual segment by 360° and the screen can be fanned out in this manner.

Further functionalities can also be provided via the guide of the individual segments relative to one another. In a simple case, in is thus possible, for example, for the individual segments to be held at a distance to one another via the guide. In this case, the individual segments will project upward, so that a slight turbine-like overall structure follows, so that steam can escape, for example. Such an embodiment makes sense, namely when steam is to escape from the pan, but when a certain splash guard is to be provided. Such a vessel cover can furthermore contribute to saving energy, in particular when it is made of reflective metal, because a portion of the heat from the pan is reflected into the pan and back onto the food to be cooked. In this case, the individual segment, which is made of metal, then acts as heat store and as heat-reflecting surface.

The supports can furthermore also be embodied such that a locked position results in each case on the two stops, in which the individual segments are initially held against an elastic retaining force. This prevents that the cover opens unintentionally, for example in response to a slight movement of the pan to prevent browning the food to be cooked. Such a locked position can furthermore ensure that the folded up stack is not unknowingly fanned out in the kitchen cabinet or in the drawer.

Depending on the thickness of the individual segments, the stack will encompass a certain overall thickness, wherein this gap height also remains between the first and the last individual segment of the completely opened screen, at least when the individual segments of the spread out screen are not placed at an angle, but when all of the individual segments are arranged parallel to one another.

The above-mentioned gap can be accepted deliberately, so as to provide for a certain steam-permeability or to ensure visibility into the vessel, for example. In the event that such a gap is not wanted, the uppermost individual segment can laterally encompass a splash guard in the a shape of a narrow strip, which closes this gap. In particular in combination with the stop, which has already been described above, the splash guard can also encompass a double function, namely in that it is embodied as a rigid element, which is fixedly connected to the support element. This strip, which extends laterally downward from the support element in the direction of the pan bottom, can be guided downward at least in sections to the extent that these lower sections form the lower stop. The upper area then simultaneously serves as splash guard, which covers the gap between the lowermost and the uppermost individual segment.

Further features and advantages of the invention follow from the subclaims and from the below description of preferred exemplary embodiments by means of the drawings.

FIG. 1 shows a vessel cover according to the invention in the fanned out state,

FIG. 2 shows the vessel cover from FIG. 1 in a side view,

FIG. 3 shows the vessel cover, as it is illustrated in FIGS. 1 and 2, but with folded up individual segments here, FIG. 4 shows the vessel cover from FIG. 3 in a side view and FIG. 5 shows the vessel cover from FIGS. 3 and 4 in a view from the front.

A vessel cover according to the invention is illustrated in FIGS. 1 to 5. As can best be seen from FIG. 1, the vessel cover consists of an arm-like support element 4, on the end of which the axis of rotation is arranged. The individual segments 2 in the shape of triangles comprising a rounded rear edge area are rotatably supported along the axis of rotation. These individual segments 2 thus have substantially the shape of the cross section of a piece of cake.

On its rear end, which faces away from the axis of rotation, the support element 4 is provided with a hook, via which it can be hung up in the kitchen by means of the typical hanging means. In particular in combination with such a support element 4, which can be hung up, it is advantageous when the individual segments 2 are held tightly in the stack, so that the uppermost individual segment 2 does not rotate due to the force of gravity and thus pulls up the screen unintentionally in the hanging state.

The stack of the individual segments 2 can be secured against unintentional opening via frictional forces, for example, which can be created via the bearing of the individual segments on the axis of rotation. The afore-described mechanical fixation of the individual segments is furthermore possible, provided that they are then folded up to form a stack. It goes without saying that provision can in the alternative also be made for a pocket, into which the folded up vessel cover is inserted.

The individual segments 2 can be rotated about the axis of rotation and are held on the opposite end in guide grooves 3, which connect the individual segments 2 to the individual segment 2, which is located therebelow or thereabove, respectively. These guide grooves 3 encompass the shape of bearing journals herein, which are held in radial passage gaps in the outer area of the individual segment 2, which is located therebelow. The guide grooves 3, which form the bearing journal, simultaneously form a front stop 6 and a rear stop 7 for the movement of an individual segment 2 to one respective individual segment 2 located therebelow or thereabove, respectively.

The lowermost individual segment 2 encompasses a small guide journal in the direction of the handle 5, which serves as handling element. In the shown exemplary embodiment, the individual segments encompass grooves or bead-like elevations, respectively, which prevent that the individual segments, which are located on top of one another, are located completely next to one another, which, in turn, can lead to a scratching of the high-gloss segments. This furthermore results in the fanning out movement being simplified considerably.

The vessel cover from FIG. 1 is illustrated in FIGS. 2 to 5 as being fanned out and folded up in further positions.

LIST OF REFERENCE NUMERALS 1 cover
2 individual segments
3 guide groove
4 support element
5 handle
6 front stop
7 rear stop

The invention claimed is:

1. A splash guard for a cooking or household vessel, comprising:
 a support element, including a handle; and
 a cover configured to be placed on the vessel, wherein the cover is formed from a plurality of individual segments, wherein the individual segments are supported on an end of the support element, relative to one another, so as to be rotatable about an axis of rotation arranged at the end of the support element, at different heights from an inoperative position into an operative position in which they are fanned out to form the cover,
 wherein the handle projects beyond the cover in a closed state,
 wherein the individual segments are supported on the support element such that in the inoperative position, a stack formed by the individual segments is arranged above or below the support element, and
 wherein the individual segments are in each case connected to an adjacent individual segment via a bearing journal that projects from one side of a given individual segment in a direction of an adjacent individual segment and interacts with a guide groove, which is arranged radially on an edge of the given individual segment such that the given individual segment is guided in a positive manner and such that the given individual segment is radially movable between a front stop and a rear stop.

2. The splash guard according to claim 1, wherein on an end that faces away from the axis of rotation, a lowermost individual segment encompasses an abutment, which projects downward, and which is able to support itself against an edge of the vessel in response to the rotation of the support element, so that the cover can be fanned out due to the lower individual segment, which is held via the abutment and due to the rotation of the support element.

3. The splash guard according to claim 1, wherein the support element is embodied so as to be capable of being extended at least in sections in a telescoping manner, so that the handle can be displaced radially outward.

4. The splash guard according to claim 1, wherein the individual segments are plane segments having a shape of a cross-sectional surface of a piece of cake, through a tip of which the axis of rotation runs.

5. The splash guard according to claim 4, wherein the individual segments are formed uniformly and are arranged such that the cover is circular in the closed state.

6. The splash guard according to claim 1, wherein the individual segments encompass two or more different lengths and shapes such that the cover, when closed, is of a square, rectangular or oval shape.

7. The splash guard according to claim 1, wherein the support element encompasses a hinge in an area of the axis of rotation, so that the cover is swivel-mounted to the support element.

8. The splash guard according to claim 1, further comprising a shaft, concentric to the axis of rotation, wherein the individual segments are releasably arranged on the shaft.

9. The splash guard according to claim 1, wherein one or more of the individual segments at least partially consists of a steam-permeable material.

10. The splash guard according to claim 1, wherein one or more of the individual segments at least partially consists of a steam-tight material.

11. The splash guard according to claim 2, wherein provision is made on at least one end of the guide groove of a given individual segment for an interacting bearing journal to be in a locked position, wherein the bearing journal is held so as to be resilient in the locked position and can be released from the locked position by applying a slight release force.

12. The splash guard according to claim 1, wherein an uppermost individual segment, on an edge of the uppermost individual segment that runs toward the axis of rotation and traverses the vessel, includes a side guard in a shape of a narrow strip, wherein the side guard hangs down and has a width that is slightly smaller than the height of the stack of the individual segments when placed on top of one another, and wherein the side guard is configured to close a gap between the uppermost and lowermost individual segments.

13. The splash guard according to claim 2, wherein the bearing journals are embodied such that they are capable of holding adjacent individual segments at a distance relative to one another, so that a steam-permeable gap remains between the adjacent individual segments.

* * * * *